(No Model.) 6 Sheets—Sheet 1.

G. WESTINGHOUSE.
HYDRAULIC PUMPING AND MOTOR APPARATUS.

No. 595,027. Patented Dec. 7, 1897.

WITNESSES:
Ethan D. Dodds
H. C. Tener

INVENTOR
George Westinghouse
BY Wesley G. Carr
ATTORNEY.

(No Model.) 6 Sheets—Sheet 3.

G. WESTINGHOUSE.
HYDRAULIC PUMPING AND MOTOR APPARATUS.

No. 595,027. Patented Dec. 7, 1897.

Fig. 5

WITNESSES:
Ethan I. Dodds
H. C. Tener

INVENTOR
George Westinghouse
BY
Wesley G. Carr
ATTORNEY.

(No Model.) 6 Sheets—Sheet 4.

G. WESTINGHOUSE.
HYDRAULIC PUMPING AND MOTOR APPARATUS.

No. 595,027. Patented Dec. 7, 1897.

WITNESSES
Ethan D. Dodds
H. C. Tener

INVENTOR
George Westinghouse
BY
Wesley G. Carr
ATTORNEY.

UNITED STATES PATENT OFFICE.

GEORGE WESTINGHOUSE, OF PITTSBURG, PENNSYLVANIA.

HYDRAULIC PUMPING AND MOTOR APPARATUS.

SPECIFICATION forming part of Letters Patent No. 595,027, dated December 7, 1897.

Application filed April 12, 1897. Serial No. 631,782. (No model.)

*To all whom it may concern:*

Be it known that I, GEORGE WESTINGHOUSE, a citizen of the United States, residing at Pittsburg, in the county of Allegheny and State of Pennsylvania, have invented a new and useful Improvement in Hydraulic Pumping and Motor Apparatus, (Case No. 734,) of which the following is a specification.

My invention relates to hydraulic mechanism, and more particularly to rotary pumping mechanism and to means for utilizing the hydraulic pressure produced thereby.

One of the objects of my invention is to produce a rotary pump which shall be simple and compact in construction and which may be readily controlled and adjusted either manually or by conjoint electromagnetic and hydraulic agencies.

A further object of my invention is to provide a novel and efficient means for operating hydraulic elevators, rams, &c.

With these ends in view I have devised the mechanism illustrated in the accompanying drawings and hereinafter described.

The rotary hydraulic machine which constitutes one portion of my invention is shown as a pump employed for actuating a reciprocating piston forming part of an elevator-operating mechanism, and for convenience it will be so described in detail. I desire it to be understood, however, that the machine may be employed in connection with a hydraulic motor of any type and that it may itself be utilized as a motor either in connection with a pump of similar construction or by liquid supplied to it under pressure from any source.

In the accompanying drawings.

Figure 4:
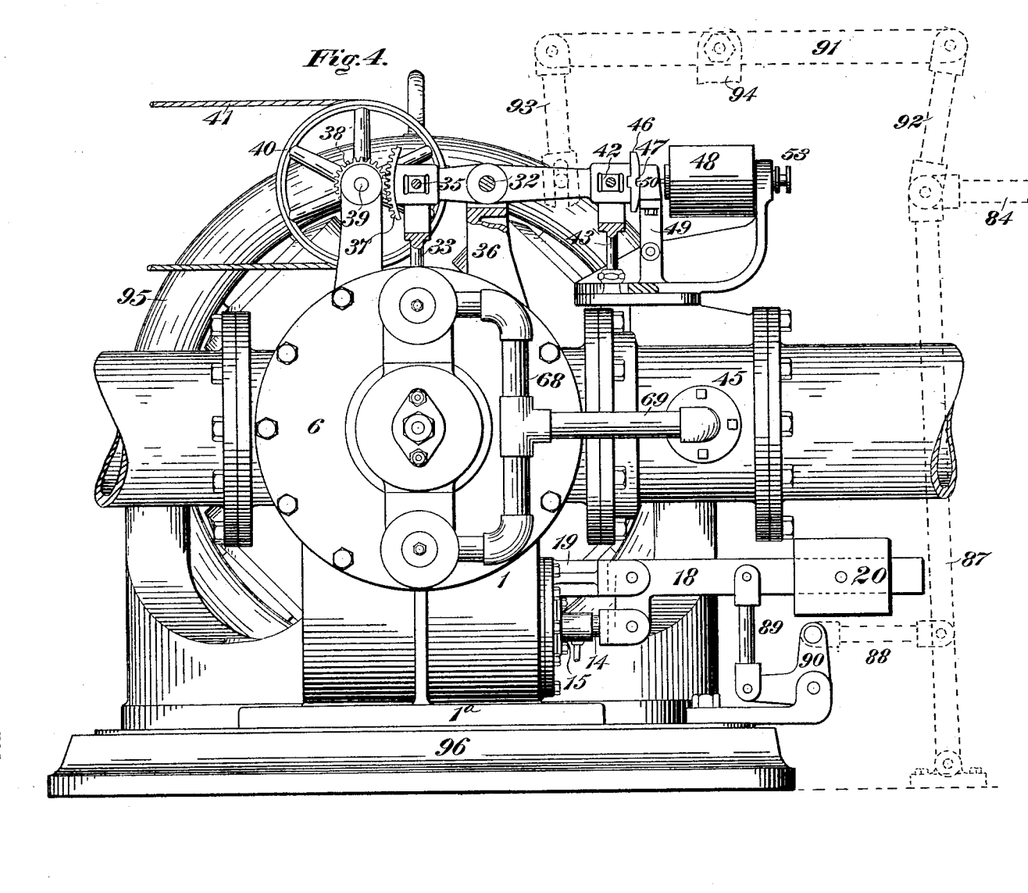
Fig. 4 is a side elevation of the pump and the main coöperating parts which are directly connected therewith.
Figure 5:
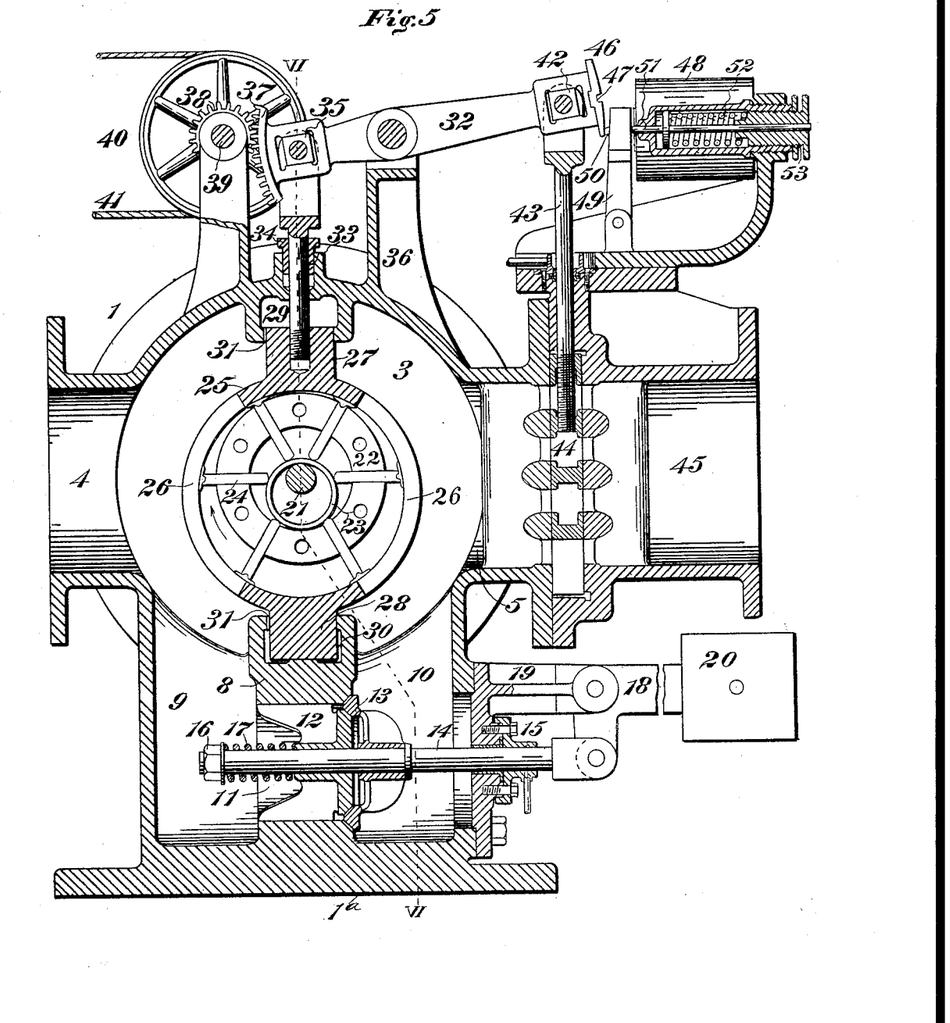
Fig. 5 is a transverse section through the pump and the adjacent parts of the apparatus.
Figure 6:
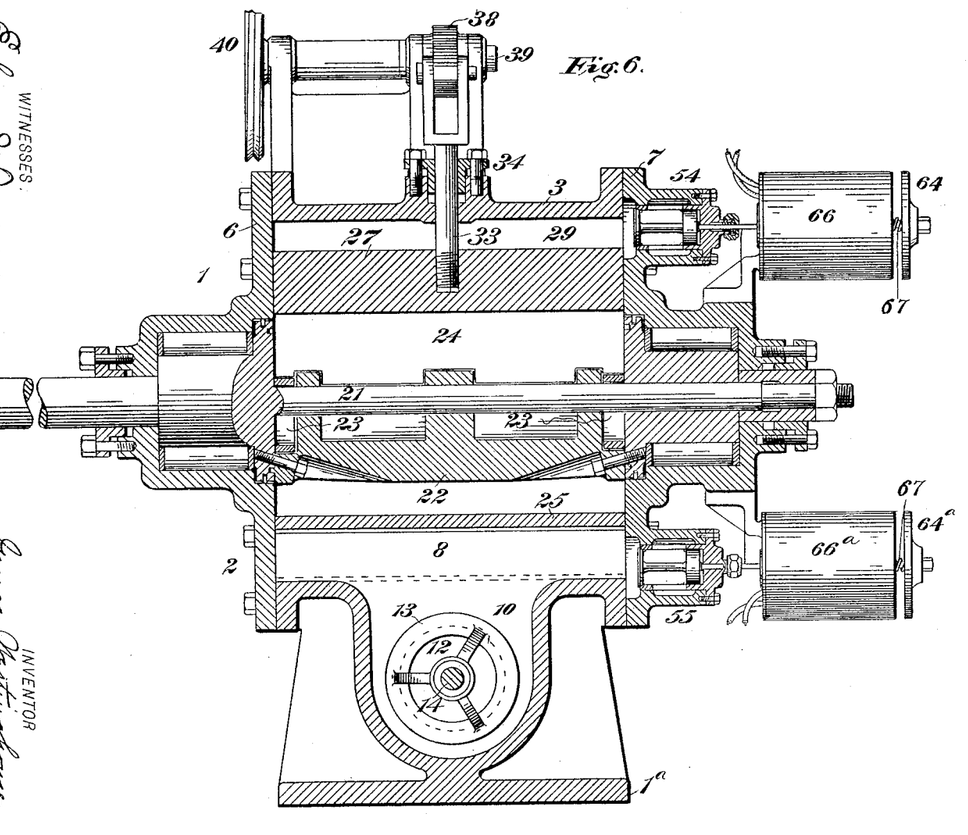
Fig. 6 is a longitudinal section taken on line VI VI of Fig. 5, except that the piston-slides are shown in different positions in the two figures.
Figures 7, 8, 9:
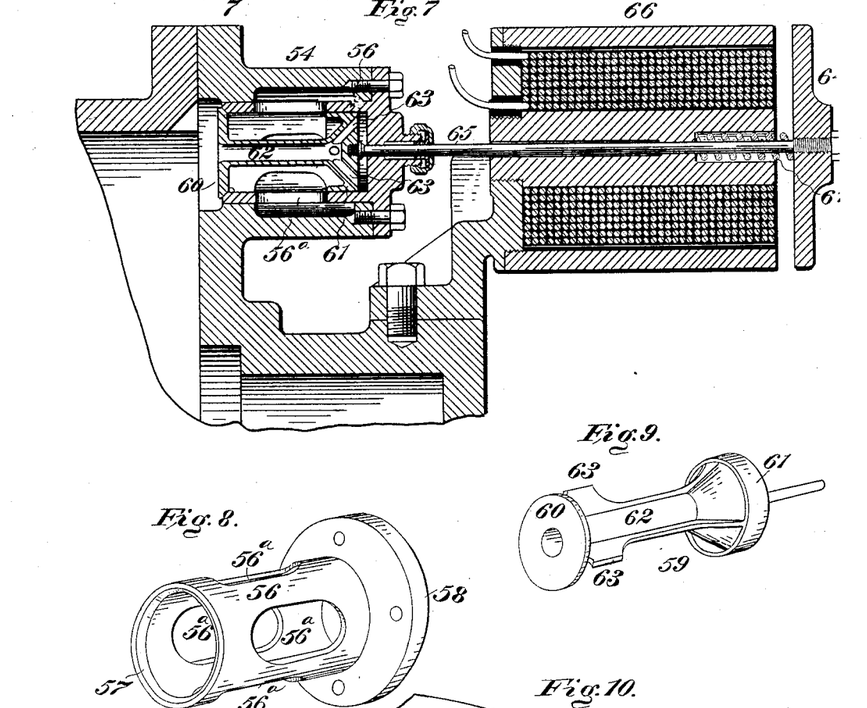
Fig. 7 is a detail sectional view of one of the pump-valves, its cylinders, and actuating-magnet.
Figs. 8 and 9 are respectively perspective views of the inner cylinder and valve shown in Fig. 7.
Figure 10:
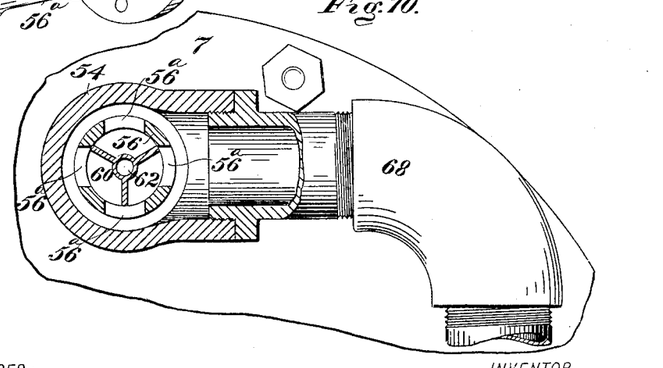
Fig. 10 is a detail view, partially in elevation and partially in section, of the valve, its cylinders, and a portion of the outlet-pipe of Fig. 7.

Referring particularly to Figs. 4, 5, and 6 of the drawings, 1 is the pump, the base 1$^a$ of which may be cast integral with the main part 2 of the pump-casing, as shown, or it may be cast separately and bolted to the casing, if desired. The main part 2 of the pump-casing embodies a cylindrical portion 3, having at one side a port 4 and at the opposite side a port 5. The ends of the cylindrical portions 3 are respectively closed by heads 6 and 7, bolted or otherwise fastened in position.

Below the cylindrical portion 3 of the pump-casing is a space which is separated by a laterally-disposed partition 8 into two chambers 9 and 10, each of which is in open communication with said cylindrical portion. The partition 8 is provided with a passage 11, which extends through it from side to side and is normally closed by two valves 12 and 13, both of which are located at the end of the passage opening into the chamber 10 and form in effect a two-part double-acting valve. The part 12 is mounted loosely and the part 13 rigidly upon a longitudinally-movable rod 14, which extends through a stuffing-box 15 in the outer side of chamber 10. The inner end of the rod 14 is shown as provided with a nut 16, between which and the inner end of valve 12 is located a coiled spring 17. The outer end of the rod 14 is shown as pivoted to one arm of a bell-crank lever 18. This lever is pivotally supported by a bracket 19 and is provided with a longitudinally-adjustable weight 20. It will be understood that any well-known mechanical equivalent, such as a spring or a cord and weight, may be employed in lieu of the lever and weight shown. It will be understood also that the chambers 9 and 10, passage 11, and the coöperating valve mechanism may be located outside of the main casing, if desired.

Located concentrically in the cylindrical portion 3 of the pump-casing is a shaft 21, which may be provided with enlarged bearing portions mounted in roller-bearings in the heads 6 and 7, as indicated in Fig. 6, or in other suitable bearings. A drum 22 is mounted upon shaft 21 and is provided with a cavity at each end, in which is located a ring 23. The drum is also provided with a plurality of radial slots, in which are located piston-slides 24. The inner edges of these slides, at or near their ends, are in contact, or nearly in contact, with the rings 23. A cylinder 25 incloses the drum 22 and its piston-slides 24 and is provided at each side with a port 26. The cylinder 25 is also provided at its top with a longitudinal guide-piece 27 and at its bottom with a similar guide-piece 28. The guide-piece 27 is inclosed in and guided by the side walls of a guide-chamber 29, and the guide-piece 28 is similarly inclosed and guided by the side walls of a guide-chamber 30. On the side corresponding to the port 4 a small opening or passage 31 is provided which leads from the cylindrical portion of the drum-casing into each of the chambers 29 and 30. As shown in the drawings, these openings are located between the sides of the guide-pieces 27 and 28 and the adjacent sides of the corresponding guide-chambers; but it is obvious that the form and location of the openings may differ from what is shown, if desired.

The cylinder 25 is connected to one arm of a lever 32 by means of a rod or stem 33, which projects through a stuffing-box 34. The stem 33 is pivoted at its upper end to a block 35, which is mounted in lever 32, so as to have a limited sliding movement longitudinally. Lever 32 is pivoted to a bracket 36 and may be provided at the end adjacent to the block 35 with a gear-segment 37, which meshes with a pinion 38, mounted on a shaft 39, the latter being mounted in suitable bearings supported by the pump-casing. The shaft 39 may also be provided with a wheel 40, over which passes a rope 41. Any other suitable means for tilting the lever 32 may be employed in lieu of that shown, if desired. The other arm of lever 32 is provided with a block 42, similar to block 35, to which is pivoted the upper end of a stem 43. The lower end of stem 43 is attached to a cut-off valve 44, which is located adjacent to the port 5 and in a pipe 45, with which said port communicates. The end of lever 32 adjacent to the block 42 is provided with a head 46, having a curved outer face, in the middle of which is a notch 47. An electromagnet 48 is located in front of the head 46, and a pivoted armature 49 for the magnet 48 is provided with a lug or projection 50, adapted to fit into the notch 47. The lug 50 is normally held in contact with the head 46 by a pin 51 and a coiled spring 52, the degree of pressure exerted by this spring being varied by means of a screw-threaded plug 53.

Referring now more particularly to Figs. 6 to 10, the head 7 is provided with two valve cylinders or chambers 54 and 55, the former communicating with guide-chamber 29 and the latter with guide-chamber 30. In each of these cylinders or chambers is an auxiliary cylinder 56, which is provided with a plurality of side openings 56$^a$ and an inner open end 57, constituting a valve-seat. The outer end 58 of the cylinder 56 constitutes the head of the chamber 54 or the chamber 55, as the case may be. Each cylinder 56 is provided with a valve 59, which has an inner head 60 and an outer head 61, connected by a tube 62, and suitable guide-wings 63. The inner end of tube 62 is open and its outer end communicates with the space beyond the head 61 by inclined passages 63. By reason of this construction the same fluid-pressure is exerted in opposite directions against the two ends of the valve. The head 61 of the valve in cylinder 54 is connected to an armature 64 by means of a rod 65, which extends through the core of an electromagnet 66. The armature 64 is normally held away from the magnet by means of a coiled spring 67. The valve in cylinder 55 is similarly connected to an armature 64$^a$ of a magnet 66$^a$. The cylinders or chambers 54 and 55 are connected by a pipe 68, and this pipe is connected to pipe 45 by a branch pipe 69.

Referring particularly to Figs. 1 to 5, 70 is a cylinder which is closed at both ends by suitable heads and is supported upon standards 71, which may be of any desired dimensions and shape. A piston 72 is located in the cylinder 70 and is provided with a stem 73, which projects through a suitable stuffing-box in one of the cylinder-heads. A plurality of grooved wheels or sheaves 74 are mounted in a frame 75, which is supported upon the outer end of the stem 73. A similar series of sheaves 76 are mounted in stationary brackets 77 at the opposite end of cylinder 70. A pair of cables 78 are attached at one end to a stationary part and extend back and forth over the several sheaves 74 and 76, and thence over suitable guiding and supporting sheaves to the elevator-car 79, as is usual in such apparatus. The frame 75 and its sheaves 74 are supported and guided by tracks 80, the frame 75 being provided with supporting and guiding wheels or rollers 81, which engage with these tracks. The port 5 of the pump is connected to the end of the cylinder 70, corresponding to the rear side of the piston 72, by means of the pipe 45 or by means of a separate pipe 82, which is coupled to the pipe 45, so as to form a continuation of it, as indicated in the drawings. The port 4 of the pump is connected with the opposite end of the cylinder by means of a pipe 83. A longitudinally-movable rod 84 is mounted in suitable supports parallel to the tracks 80, and is provided at or near its outer end with a nut or other projection 85, which is in position to be engaged by a projection 86 on the frame 75 when the piston 72 attains the limit of its stroke in one direction. The inner end of the rod 84 is connected to a pivoted lever 87, and this lever is connected by links 88 and 89 and a bell-crank lever 90 to the lever 18 for operating the valve 13. Lever 87 is also connected to the long arm of lever 32 by means of a rocking lever 91 and links 92 and 93, the lever 91 being pivoted to a stationary support 94 and link 93 having a slot-and-pin connection with lever 32.

The drum-shaft of the pump which forces liquid into cylinder 70 may be driven by any suitable motor, but in the present instance I have shown it as driven by an electric motor 95, the armature-shaft of which is directly coupled to the drum-shaft of the pump. Both the pump and the motor are shown as mounted upon a single base 96, but this arrangement is obviously not essential.

The operation of the apparatus when the pump-shaft 21 is constantly driven in the direction indicated by the arrow in Fig. 5 is as follows: The several parts being in the positions indicated in Figs. 1 and 5, the piston-slides 24 will draw liquid from cylinder 70 through the pipes 82 and 45 and the port 5 and force it through the port 4 and pipe 83 into cylinder 70 in front of piston 72, the body of liquid being sufficiently large to fill the entire space in the pump-casing, the cylinder 70, and the connecting-passages not occupied by the mechanical parts of the apparatus. As the liquid is pumped from the rear of piston 72 and forced in front of it the piston will be moved rearwardly and thus raise the elevator-car. If the load upon the latter exceeds the amount for which the weight 20 is set, the back pressure will unseat the valve 13 and the liquid will be pumped through the by-pass 11 instead of into the cylinder 70. It is thus possible, as will be readily understood, to set the weight 20 for any desired maximum load. When the piston 72 reaches the rear end of cylinder 70, the back pressure will be sufficient to unseat valve 13 even if no adjustment of the pump-cylinder is made. In order that the operation of this safety-valve may not be entirely dependent upon the back pressure of liquid, however, I provide the rod 84, projections 85 and 86, levers 87 and 90, and links 88 and 89, which serve to automatically unseat valve 13 when the elevator-car has reached the limit of its upward movement. When it is desired to stop the movement of the elevator, the cylinder 25 is raised until it is concentric with the shaft 21 and the drum 22, as is indicated in Fig. 4. This movement of the cylinder 25 will effect a corresponding movement of the valve 40, so as to cut off communication between the pump and the pipe 45 by reason of the simultaneous movement of stems 33 and 43 as the lever 32 is rocked on its pivot. If it is desired to reverse the movement of the elevator-car, the lever 32 will be rocked an additional distance in the same direction until the cylinder is in its extreme upper position and the valve 44 in its extreme lower position, when the liquid will be drawn into the pump through the port 4 and forced out through the port 5.

I have shown two independent means for varying the eccentricity of the cylinder 25, but the invention, broadly considered, is not dependent upon either of these means. If the wheel 40 be turned, either directly by hand or through the agency of the rope 41, the lever 32 will be correspondingly rocked and the cylinder 25 and valve 40 be reversely moved. These parts will also be automatically moved to their middle positions when the piston 72 reaches the limit of its outward stroke by means of the rod 84, projections 85 and 86, levers 87 and 91, and links 92 and 93.

My combined electrical and hydraulic means for controlling and actuating the cylinder 25 and valve 40 operate as follows, (see Figs. 1 and 3:) One end of the coil of each magnet 48, 66, and $66^a$ is connected to one pole of a suitable source of current $66^b$ and the other ends of these coils are respectively connected to corresponding stationary terminals of circuit-closers $a\ b\ c$, located on the elevator-car. The circuit is closed through the source of current 96 and any or all of the magnets by means of the corresponding circuit closer or closers, as will be readily understood. When the parts are in the position shown in Figs. 1, 5, 6, and 7, if the circuit of magnet 66 be closed it will move its armature 64 inward and thus unseat the valve 59. The water will then flow out through pipes 68 and 69 into pipe 45, thus removing the pressure from behind the guide-piece 27. The back pressure exerted through the port 4 will force water through the passage 31 and behind the guide-piece 28 and thus raise the cylinder 25. When the middle or concentric position is reached, the projection 50 on the armature 49 will enter the recess 47 in the head 46 and lock the parts in that position, provided the circuit of magnet 48 is open. In order to release the parts so as to continue the movement, it is merely necessary to close the circuit of the magnet 48 and thus effect the withdrawal of the projection 50 from notch 47. The reverse movement of the cylinder 25 and valve 44 will obviously be effected by closing the circuit of the magnets $66^a$ and 48, the button controlling the circuit of magnet 48 being so arranged that it may be worked in conjunction with either of the magnets 66 and $66^a$.

Figure 11:
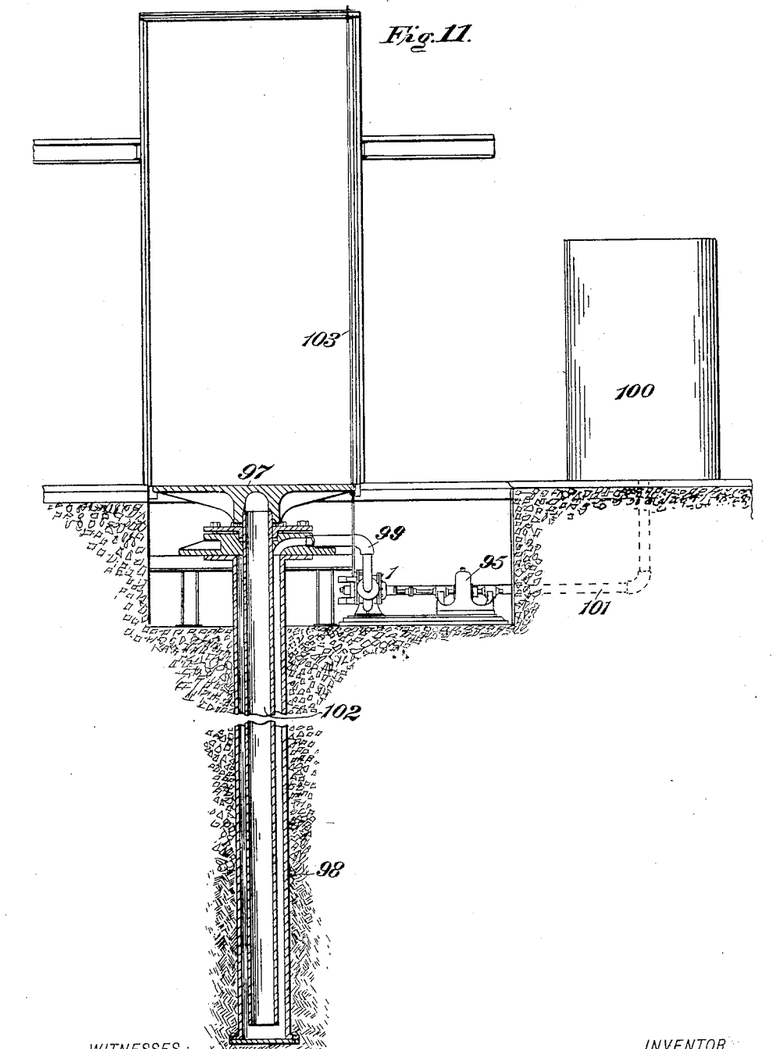
Fig. 11 is a view, partially in side elevation and partially in section, of a hydraulic ram constructed and operated in accordance with my invention.

In Fig. 11 I have shown my invention as applied to a hydraulic ram for moving a freight-elevator platform 97, one port of the pump being connected to a cylinder 98 by means of a pipe 99 and the other port being connected to a supply-tank 100 by means of a pipe 101. A pipe 102 extends downward from the platform 97 into the cylinder 98, the entire operating apparatus being below the level of the floor from which freight is to be raised.

Figures 1, 2, 3:
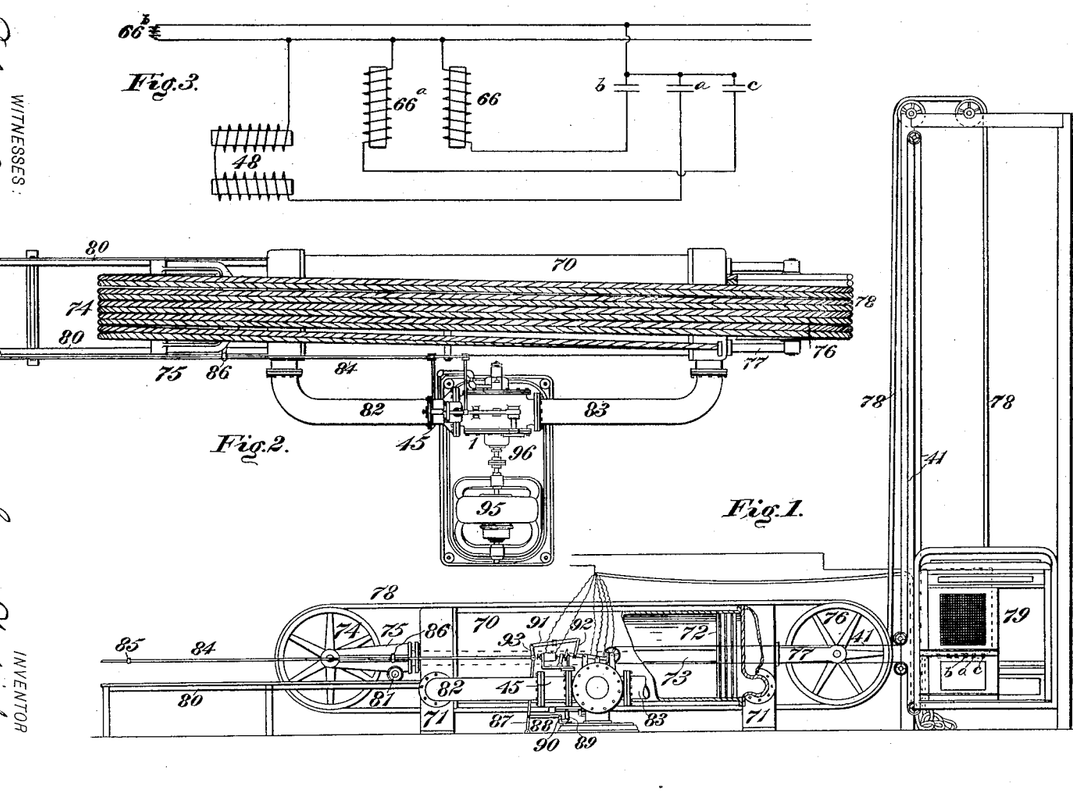
Figure 1 is a view, mainly in side elevation, of an elevator and hydraulic operating mechanism constructed in accordance with my invention.
Fig. 2 is a plan view of the main portions of the operating mechanism shown in Fig. 1.
Fig. 3 is a diagram of the electric circuits employed for controlling the hydraulic apparatus.

It will be understood that the apparatus shown in Figs. 1 and 2 may also embody a tank, if desired, in which case the pipe 82 would connect the pump with such tank instead of connecting it with the rear end of cylinder 70.

I desire it to be understood also that either a small reservoir or a safety-valve may be employed in connection with the pipe 82, if found necessary or desirable on account of the displacement of water in cylinder 70 by piston-rod 73, when the piston 72 is moved from the rear to the front end of the cylinder.

The pump shown in Fig. 11 may be constructed and operated like the one already described, safety devices similar to those already described being actuated by the platform at the extremities of its movements through a rod 103, provided with suitable projections.

I desire it to be understood that my invention is not limited either to the details of construction shown and described or to the specific uses which have been pointed out.

I do not herein broadly claim the combination, in elevator-operating mechanism, of a cylinder and piston and means for controlling the flow of water to and from such cylinder comprising a rotary pump having a transversely-adjustable cylinder, a cut-off valve, and a connection between such parts, whereby they are simultaneously operated, but have claimed the same in my application, Serial No. 574,243, filed January 3, 1896.

I claim as my invention—

1. In a rotary pump or motor, the combination with a casing and a rotatable drum provided with piston-slides, of a transversely-movable cylinder, provided with ports and inclosing said drum and piston-slides, means for subjecting either side of the cylinder to the action of fluid-pressure and means for simultaneously withdrawing pressure from the opposite side whereby the position of the cylinder may be adjusted at will.

2. A rotary fluid pump or motor comprising a casing, a rotatable drum provided with piston-slides, a cylinder provided with ports in its sides and inclosing said drum and piston-slides, means for admitting fluid under pressure between said cylinder and casing at either the top or the bottom and means for withdrawing the fluid at either the top or the bottom.

3. A rotary pump or motor comprising a casing having guide-chambers, a transversely-movable cylinder having ports and provided with guide-pieces located in said guide-chambers, passages leading from the high-pressure side of the pump or motor casing into the guide-chambers and a valve corresponding to each guide-chamber whereby the fluid may be discharged from either of said guide-chambers at will.

4. In a rotary pump or motor, the combination with a rotatable drum provided with piston-slides, of a transversely-movable cylinder surrounding said drum and piston-slides and provided with external guide-pieces, a casing surrounding said cylinder and having guide-chambers for said guide-pieces provided with inlet and outlet passages, valves in said outlet-passages and means for actuating said valves.

5. A rotary pump or motor embodying a rotatable drum provided with piston-slides, a transversely-movable cylinder surrounding the same, in combination with inlet and outlet passages, a by-pass and a safety-valve located therein, said valve comprising two concentric parts movable in opposite directions.

6. A rotary pump or motor comprising a rotatable drum provided with piston-slides and a transversely-movable cylinder surrounding the same, in combination with inlet and outlet pipes or passages, a by-pass and a two-part safety-valve in said by-pass, the said parts being independently movable in opposite directions.

7. A rotary pump or motor comprising a rotatable drum provided with piston-slides, a transversely-movable cylinder surrounding the same and a casing, in combination with inlet and outlet pipes or passages, a by-pass and a two-part safety-valve in said by-pass, the two parts being yieldingly held in position by separate means which exert predetermined pressures in opposite directions.

8. A rotary pump or motor comprising a rotatable drum provided with piston-slides, a transversely-movable cylinder surrounding said drum and slides and a casing having inlet and outlet ports, a by-pass, a two-part safety-valve in said by-pass, the said parts being independently movable in opposite directions, and means for yieldingly holding each to its seat with a definite pressure.

9. In a rotary pump or motor, the combination with a rotatable drum having piston-slides, of a transversely-movable cylinder surrounding the same, a casing provided with inlet and outlet ports, a valve in one of said ports, means for moving the cylinder, means connecting said valve and said cylinder whereby they are simultaneously operated, and means for automatically locking the cylinder in its middle or concentric position.

10. In a rotary pump or motor, the combination with a transversely-movable cylinder and a cut-off valve, a rocking arm or lever connecting the said parts and means for automatically locking said parts in their intermediate positions.

11. In a rotary pump or motor, the combination with a transversely-movable cylinder, of fluid-pressure-actuated means for moving the same, automatically-operating means for locking it in its middle or concentric position, and an electromagnet acting, when energized, to release said cylinder.

12. In a rotary pump or motor, the combination with a transversely-movable cylinder, of fluid-pressure-actuated means for moving the same, a spring-actuated armature for locking said cylinder in its middle or concentric position, an electromagnet for withdrawing said armature, and means located at a distance for making and breaking the circuit containing the coil of said magnet.

13. In a rotary motor or pump, the combination with a rotatable drum provided with piston-slides, of a transversely-movable cylinder inclosing said drum and piston-slides, means for applying fluid-pressure to either side of said cylinder, valves for shifting the pressure from one side to the other and electromagnets for actuating said valves in one direction.

14. The combination with a hydraulic cylinder and its piston; of a rotary, eccentric piston-pump for forcing liquid into said cylinder and provided with a by-pass, a safety-valve in said by-pass and means actuated by the piston at the end of its stroke to open said safety-valve.

15. The combination with an elevator-car, of a hydraulic cylinder and its piston, sets of sheaves at the respective ends of said cylinder one of which is carried by the piston, cables passing over said sheaves and connected to the car, a rotary pump having a transversely-movable cylinder and a casing provided with inlet and outlet ports and a by-pass containing a safety-valve and means actuated by the hydraulic piston at the end of its stroke to unseat the safety-valve and thus open the by-pass.

16. The combination with a hydraulic cylinder and its piston and means for connecting said piston with an elevator-car, of a rotary pump having a transversely-movable cylinder, pipes connecting the inlet and outlet ports of the pump with the respective ends of the hydraulic cylinder, a cut-off valve in one of said pipes and means actuated by the piston of the hydraulic cylinder at the end of its stroke to simultaneously move the valve to the cut-off position and the pump-cylinder to its middle or concentric position.

17. The combination with an elevator car or platform, of a hydraulic cylinder and piston, connecting means between said piston and said car or platform, a rotary pump embodying a cylinder movable transversely by fluid-pressure, valves for controlling said fluid-pressure, electromagnets for actuating said valves and means carried by the car for controlling the action of said magnets.

18. The combination with an elevator-car, of a hydraulic cylinder and its piston and a cable or cables connecting said car and said piston, a rotary pump for driving said piston, means for driving said pump; mechanism actuated and controlled by fluid-pressure and electromagnetism for regulating the output of said pump independently of its driving means, and means carried by the car for controlling the pump-regulating mechanism.

In testimony whereof I have hereunto subscribed my name this 7th day of April, A. D. 1897.

GEO. WESTINGHOUSE.

Witnesses:
WESLEY G. CARR,
H. C. TENER.